US009076257B2

(12) United States Patent
Sharma et al.

(10) Patent No.: US 9,076,257 B2
(45) Date of Patent: Jul. 7, 2015

(54) RENDERING AUGMENTED REALITY BASED ON FOREGROUND OBJECT

(71) Applicant: QUALCOMM Incorporated, San Diego, CA (US)

(72) Inventors: Piyush Sharma, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 13/733,740

(22) Filed: Jan. 3, 2013

(65) Prior Publication Data

US 2014/0184644 A1  Jul. 3, 2014

(51) Int. Cl.
*G09G 5/00* (2006.01)
*G06T 19/00* (2011.01)
*G06F 3/01* (2006.01)
*G06T 7/00* (2006.01)

(52) U.S. Cl.
CPC .............. *G06T 19/006* (2013.01); *G06F 3/017* (2013.01); *G06T 7/0044* (2013.01); *G06T 2207/20224* (2013.01); *G06T 2207/30196* (2013.01)

(58) Field of Classification Search
CPC .................. G06T 19/006; G06T 19/00; G06T 2207/30244
USPC .......................................... 345/619, 633, 646
See application file for complete search history.

(56) References Cited

U.S. PATENT DOCUMENTS

| 7,643,024 | B2 | 1/2010 | Bell et al. | |
| 2007/0216675 | A1* | 9/2007 | Sun et al. | 345/419 |
| 2008/0137940 | A1 | 6/2008 | Kakinami et al. | |
| 2010/0002909 | A1 | 1/2010 | Lefevre et al. | |
| 2010/0045448 | A1 | 2/2010 | Kakinami | |
| 2011/0216060 | A1 | 9/2011 | Weising et al. | |
| 2012/0050324 | A1* | 3/2012 | Jeong et al. | 345/633 |
| 2012/0062702 | A1 | 3/2012 | Jiang et al. | |
| 2012/0075343 | A1* | 3/2012 | Chen et al. | 345/633 |
| 2012/0113223 | A1 | 5/2012 | Hilliges et al. | |
| 2012/0243732 | A1* | 9/2012 | Swaminathan et al. | 382/103 |

OTHER PUBLICATIONS

Buchmann, et al., "FingARtips—Gesture Based Direct Manipulation in Augmented Reality," Proceedings of the 2nd international conference on computer graphics and interactive techniques, 2004, pp. 212-221.

(Continued)

*Primary Examiner* — Ke Xiao
*Assistant Examiner* — Kim-Thanh T Tran
(74) *Attorney, Agent, or Firm* — Silicon Valley Patent Group LLP

(57) ABSTRACT

A mobile device detects a moveable foreground object in captured images, e.g., a series of video frames without depth information. The object may be one or more of the user's fingers. The object may be detected by warping one of a captured image of a scene that includes the object and a reference image of the scene without the object so they have the same view and comparing the captured image and the reference image after warping. A mask may be used to segment the object from the captured image. Pixels are detected in the extracted image of the object and the pixels are used to detect the point of interest on the foreground object. The object may then be tracked in subsequent images. Augmentations may be rendered and interacted with or temporal gestures may be detected and desired actions performed accordingly.

45 Claims, 7 Drawing Sheets

(56) References Cited

OTHER PUBLICATIONS

Oka, et al., "Real-time Fingertip tracking and gesture recognition," IEEE Computer Graphics and Applications, 22(6), pp. 64-71, 2002.
International Search Report and Written Opinion—PCT/US2013/073510—ISA/EPO—Mar. 18, 2014.
Malik S. et al., "Visual Touchpad: A Two-handed Gestural Input Device", In Conference on Multimodal Interfaces (ICMI'04), Oct. 13-15, 2004, 8 Pages.
Malik, S.et al, "Hand tracking for interactive pattern-based augmented reality", Mixed and Augmented Reality, 2002, ISMAR 2002, Proceedings international Symposium on Issue Date. 2002. pp. 117-126.
Vo N., et al., An Effective Human-Computer Interaction Framework Using Skin Color Tracking and Gesture Recognition, Computing and Communication Technologies, Research, Innovation, and Vision for the Future (RIVF), 2010 IEEE RIVF International Conference On, IEEE, Piscataway, NJ, USA, Nov. 1, 2010, pp. 1-6, XP031799645, ISBN• 978-1-4244-8074-6.
Hebert, M., et al., "Detecting & Using Object Boundaries", Website: http://www.cs.cmu.edu/-stein/nsf_webpage/, Date Accessed: Oct. 4, 2010, 10 pages.
Iwata, T., et al., "Traditional games meet ICT: A case study on go game augmentation", Tei '10—Proceedings of the 4th International Conference on Tangible, Embedded, and Embodied Interaction 2010—Association for Computing Machin, Jan. 2010, pp. 237-240, XP002674992, DOI: D01:10.1145/1709886, 1709933, the whole document.
Kim, S., et al., "Using keyboards with head mounted displays", Proceedings VRCAI 2004—ACM Siggraph International Conference on Virtual Reality Continuum and its Applications in Industry—2004, pp. 336-343, XP002674991, sections 3,4,6, figures 4,11,16.
Lee, G.A. et al., "Occlusion based Interaction Methods for Tangible Augmented Reality Environments," Proceedings of the 2004 ACM SIGGRAPH International Conference on Virtual Reality Continuum and Its Applications in Industry (VRCAI '04), Jan. 1, 2004, pp. 419-426, XP55005457, 1 New York, New York, USA DOI: 10.1145/1044588.1044680. ISBN: 978-1-58-0113884-9.
McDonald, C., et al., "Replacing a Mouse with Hand Gesture in a Place-Based Augmented Reality System", Proceedings of 16th International Conference On Vision Interface, Jun. 11, 2003, 10 pages, XP002674990, Halifax, Nova Scotia, Canada, sections 1-3.
Ullmer, B., et al., "Emerging Frameworks for Tangible Use Interfaces", Feb. 8, 2001, pp. 1-15, XP002674993, Retrieved from the Internet: URL:http://web.media.mit.edu/-ullmer/papers/tui-millenium-chapter.pdf [retrieved on Apr. 27, 2012], section "Terminology" in p. 6-7.

* cited by examiner

RENDERING AUGMENTED REALITY BASED ON FOREGROUND OBJECT

BACKGROUND

1. Background Field

Embodiments of the subject matter described herein are related generally to detecting and tracking a movable object in a series of captured images, such as a video stream, and more particularly to using the moveable object to interact with augmentations rendered in the display of the captured images.

2. Relevant Background

In augmented reality (AR) applications, a real world object is imaged and displayed on a screen along with computer generated information, such as an image, graphics, or textual information. The computer generated information is rendered over the real world object and may be used, e.g., to provide graphical or textual information about the real world object or for entertainment purposes, such as animations or gaming. The ability of a user to conventionally interact with rendered objects displayed in AR type applications, however, is limited and non-intuitive.

Current approaches for a user to interact with rendered objects typically use physical input elements on the device, such as buttons or a touch screen. Another approach to interaction between the user and a rendered augmentation is referred to as virtual buttons. A user may interact with virtual buttons by occluding a pre-designated area of the imaged scene with an object, such as a finger. The occlusion of the pre-designated area can be visually detected and in response an action may be performed. The resulting augmentation with virtual buttons, however is limited, as the user does not interact with the virtual button as if virtual button actually exists in the same space as the user.

SUMMARY

A mobile device detects a moveable foreground object in captured images, e.g., a series of video frames without depth information. The object may be one or more of the user's fingers. The object may be detected by warping one of a captured image of a scene that includes the object and a reference image of the scene without the object so they have the same view and comparing the captured image and the reference image after warping. A mask may be used to segment the object from the captured image. Pixels are detected in the extracted image of the object and the pixels are used to detect the point of interest on the foreground object. The object may then be tracked in subsequent images. Augmentations may be rendered and interacted with or temporal gestures may be detected and desired actions performed accordingly.

In one implementation, a method includes capturing an image of a scene with a foreground object that is not attached to the scene, the foreground object including a point of interest that is a distinct physical aspect; warping at least one of the image and a reference image of the scene that does not include the foreground object so the image and the reference image have a same view; comparing the image to the reference image after warping to detect pixels that belong to the point of interest on the foreground object; detecting the point of interest on the foreground object using the detected pixels; displaying the image on a display; and rendering an augmentation on the display over the image based on the point of interest.

In one implementation, an apparatus includes a camera; a display; and a processor coupled to the display and coupled to the camera to receive an image of a scene with a foreground object that is not attached to the scene, the foreground object including a point of interest that is a distinct physical aspect, the processor configured to warp at least one of the image and a reference image of the scene that does not include the foreground object so the image and the reference image have a same view, compare the image to the reference image after warping to detect pixels that belong to the point of interest on the foreground object, detect the point of interest on the foreground object using the detected pixels, display the image on the display, and render an augmentation on the display over the image based on the point of interest.

In one implementation, an apparatus includes means for capturing an image of a scene with a foreground object that is not attached to the scene, the foreground object including a point of interest that is a distinct physical aspect; means for warping at least one of the image and a reference image of the scene that does not include the foreground object so the image and the reference image have a same view; means for comparing the image to the reference image after warping to detect pixels that belong to the point of interest on the foreground object; means for detecting the point of interest on the foreground object using the detected pixels; means for displaying the image on a display; and means for rendering an augmentation on the display over the image based on the point of interest.

In one implementation, a storage medium including program code stored thereon, includes program code to receive an image of a scene with a foreground object that is not attached to the scene, the foreground object including a point of interest that is a distinct physical aspect; program code to warp at least one of the image and a reference image of the scene that does not include the foreground object so the image and the reference image have a same view; program code to compare the image to the reference image after warping to detect pixels that belong to the point of interest on the foreground object; program code to detect the point of interest on the foreground object using the detected pixels; program code to display the image on a display; and program code to render an augmentation on the display over the image based on the point of interest.

DETAILED DESCRIPTION

Figure 1:
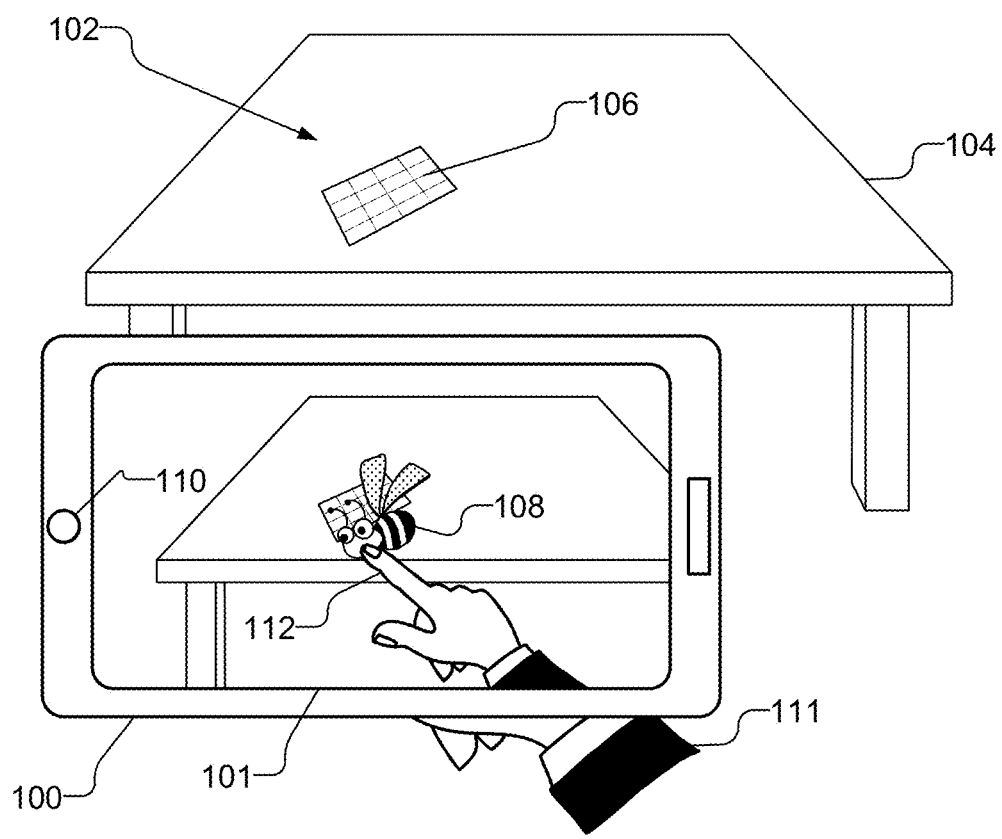
FIG. 1 illustrates a mobile device capable of detecting and tracking a moveable foreground object in captured images.

FIG. 1 illustrates a mobile device 100 capable of detecting moveable foreground object in images captured by a camera 110 without depth information. The foreground object may be, e.g., a finger 112 or hand of a user 111, or any other desired object that is not attached to the imaged scene. The foreground object may be tracked in subsequently captured images. It should be understood that the mobile device 100 may capture a video stream of the scene, where the video stream is composed of a plurality of frames or images. Accordingly, captured images, as used herein, should be understood to include individual images as well as frames of video.

Mobile device 100 is shown in FIG. 1 in landscape mode imaging a scene 102 that includes a table 104 with a target 106 and a foreground object 112 in the form of a finger of the user 111. The imaged scene, including the foreground object 112 is shown on the display 101 of the mobile device 100 along with an augmentation 108, i.e., a computer rendered object. By detecting the foreground object 112, the augmentation 108 may be rendered so as to appear that the user 111 is interacting with the augmentation 108. For example, the augmentation 108 may be rendered so that it appears to be under the foreground object 112 in the display 101. Moreover, by tracking the foreground object 112 in subsequently captured images, the augmentation may be rendered so that it appears to be touched, pushed, pulled, or otherwise manipulated by the user 111 in the display 101. Of course, the detected foreground object 112 may be used in any desired application. For example, by tracking the position of the user's fingertips over multiple images, the mobile device 100 can discern gestures made by the user and hence a user's intended action may be determined from the captured images.

As used herein, a mobile device refers to any portable electronic device capable of vision-based position detection and tracking from captured images or video streams, and may include a e.g., cellular or other wireless communication device, personal communication system (PCS) device, personal navigation device (PND), Personal Information Manager (PIM), Personal Digital Assistant (PDA), or other suitable mobile device including cameras, wireless communication devices, computers, laptops, tablet computers, etc. The mobile device may be, but need not necessarily be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

The mobile device 100 is capable of detecting and tracking the position of one or more objects 112, such as the fingers of a user 111 or other movable objects that are not attached to the imaged scene. A classifier, such as a Random Forest classifier, may be used to robustly detect the foreground object, for example. The object, which is in the foreground as it is not attached to the scene, may be detected using background segmentation. Background segmentation, however, typically requires the use of depth information. Mobile device 100, however, may perform background segmentation without depth information by estimating the background with a known target 106 and a current pose (position and orientation) of mobile device 100 with respect to the target 106. The estimated background may be subtracted from the image to identify a foreground object. Thus, to interact with a displayed augmentation, the user 111 may bring an object 112, over the background in the captured image so that the finger 112 maybe segmented and detected, e.g., using the classifier.

The mobile device 100 uses information that is already available in the tracking system (i.e., a known target and pose) to perform the background segmentation, which simplifies and accelerates the object detection process. Moreover, with the object segmented from the background, a classifier, such as a Random Forest classifier, may be used to quickly detect the object. Thus, the object can be detected as well as tracked in an efficient manner allowing the user to naturally interact with an AR augmentation, thereby enhancing user experience.

Figure 2:
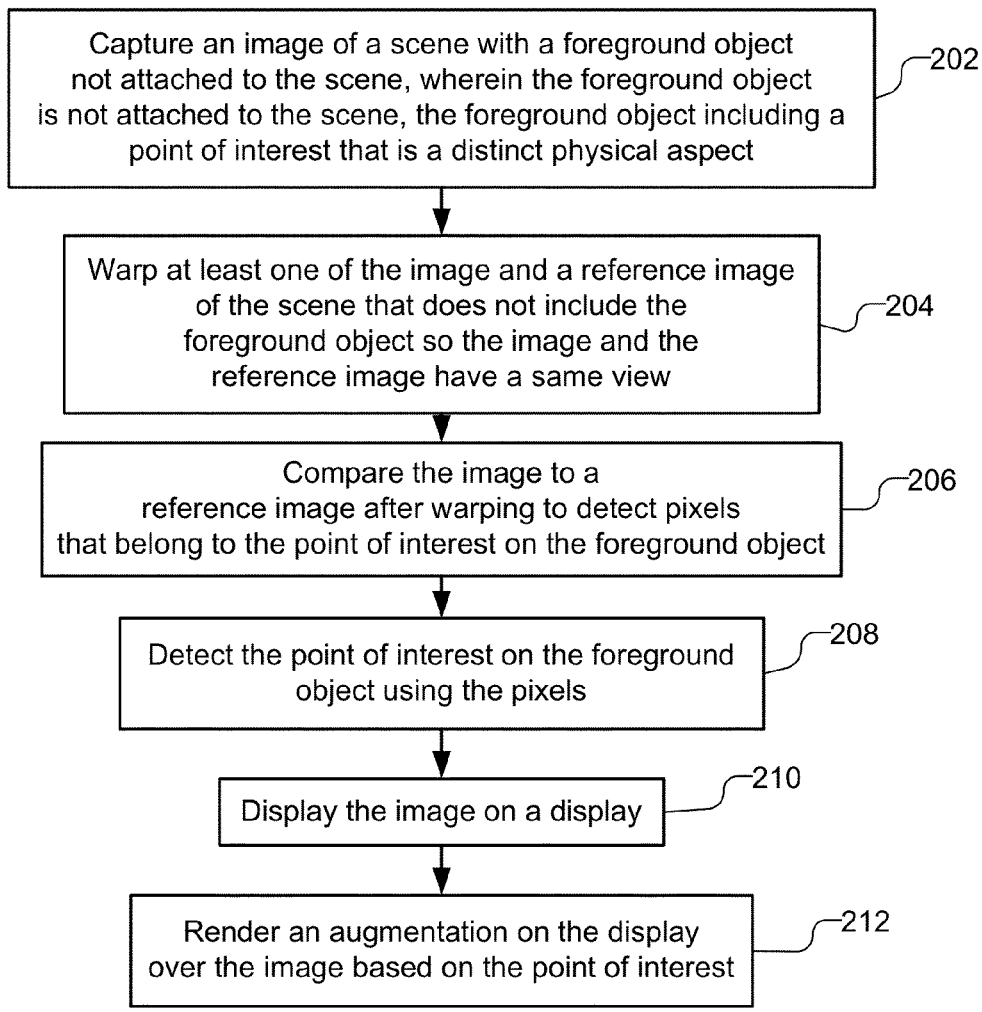
FIG. 2 is a flow chart of a method of detecting and tracking a foreground object in an imaged scene.

FIG. 2 is a flow chart of a method of detecting a foreground object in an imaged scene. As illustrated an image of a scene is captured (202). The image may be a frame of video or individual image that is captured by a camera that otherwise provides no depth information. The image includes a foreground object that is not attached to the scene, i.e., the foreground object is movable with respect to the scene. By way of example, the foreground object may be a user's finger or fingers, a pointer, or other object. The foreground object includes a point of interest, which, as used herein, is a distinct physical aspect of the foreground object. Thus, as used herein, a point of interest of the foreground object is a physical characteristic or attribute of the foreground object, such as the tip of a finger or a pointer, a fingernail on a finger, or other such object, as opposed to a feature extracted from the image using techniques, such as using SIFT (Scale Invariant Feature Transforms), SURF (Speeded Up Robust Feature), etc. The scene may include a known target to provide a pose of the camera with respect to the environment. The target may be known apriori, i.e., a reference image or model of the target may be known and stored, or the target may be learned in real-time based on one or more captured images of the scene, e.g., using Simultaneous Localization and Mapping (SLAM), or other appropriate techniques. Additionally or alternatively, the pose may be determined using, e.g., a sensor based tracker.

At least one of the image and a reference image of the scene, which does not include the foreground object, is warped so the image and the reference image have a same view (204), e.g., such as a frontal view. The reference image is of the scene or a portion of the scene and does not include the foreground object and is, thus, the background in the scene. For example, the reference image may be an image of only the known target or may be an image that includes the known target and an area around the target. The image is compared to a reference image after warping to detect pixels that belong to the point of interest on the foreground object (206). The comparison of the image and the reference image identifies the portion of the image that is the foreground object from which pixels may be detected as extracted features, e.g., using SIFT, SURF, etc. If desired, but not necessarily, a mask of the foreground object may be generated based on the comparison of the image and the reference image, and the foreground object may be segmented from the image using the mask. The pixels may then be detected using the foreground object segmented from the image. The point of interest on the foreground object is then detected using the pixels (208). By way of example, a classifier may be used to detect the point of interest on the foreground object. The input to the classifier may be, e.g., the segmented foreground object or the foreground mask, where the training data fed to the classifier would be different in the two above mentioned cases. With the use of a classifier to detect the point of interest on the foreground object, no pre-determined geometric constraints on the foreground object are required. The point of interest may then be used in any desired application. For example, the image is displayed on the display (210) and an augmentation is rendered on the display over the image based on the point of interest (212). For example, the augmentation may be rendered to appear as if the augmentation is underneath the foreground object displayed on the display. Additionally, subsequently captured images may be displayed on the display and the augmentation may be altered based on the point of interest in the subsequently captured images.

Figure 3A:
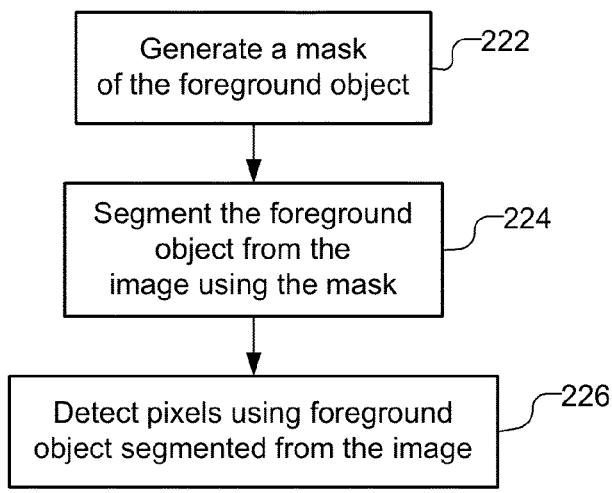
FIG. 3A is flow chart detailing a portion of the method of FIG. 2 in which the foreground object is segmented from the image using the mask.

FIG. 3A illustrates the process of comparing the image to a reference image after warping to detect pixels that belong to the point of interest on the foreground object (step 206 in FIG. 2). As illustrated, a mask is generated for the foreground object (222) based on the comparison of the image and the reference image. The mask may be produced, e.g., by subtracting pixels in the image from corresponding pixels in the reference image to generate a difference for each pixel after warping and comparing the difference for each pixel to a threshold to generate the mask. Alternatively, ratios may be generated for corresponding pixels in the image and the reference image after warping and the ratios for corresponding pixels are compared to a threshold to generate the mask. The foreground object may be segmented from the image using the mask (224) and the pixels detected using the foreground object segmented from the image (226).

Figure 3B:
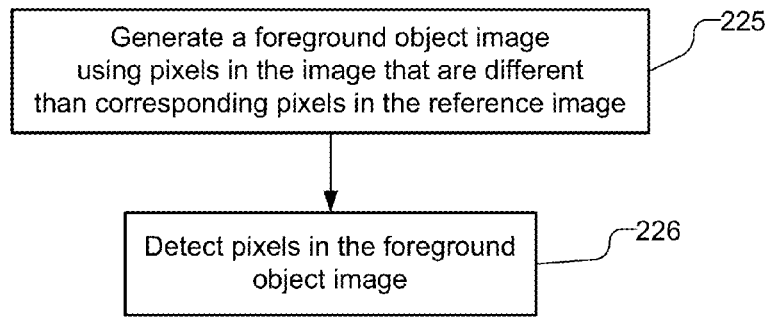
FIG. 3B is flow chart detailing a portion of the method of FIG. 2 in which the foreground object is extracted from the image without using the mask

FIG. 3B illustrates another embodiment of the process of comparing the image to a reference image after warping to detect pixels that belong to the point of interest on the foreground object (step 206 in FIG. 2), without the intermediate steps of generating a mask and segmenting the foreground object from the captured image. As illustrated, a foreground object image is generated using pixels in the captured image that are different than corresponding pixels in the reference image (225). For example, during the comparison of the warped image 284 and the reference image 282, any pixel that detected as being different, and thus in the foreground object, the pixel's intensities are copied to a corresponding location of a new image, which may be black initially. In this manner, the foreground pixels would be mapped to a foreground image. The pixels that belong to the point of interest on the foreground object may be detected, e.g., extracted, from the foreground object image.

Figure 4:
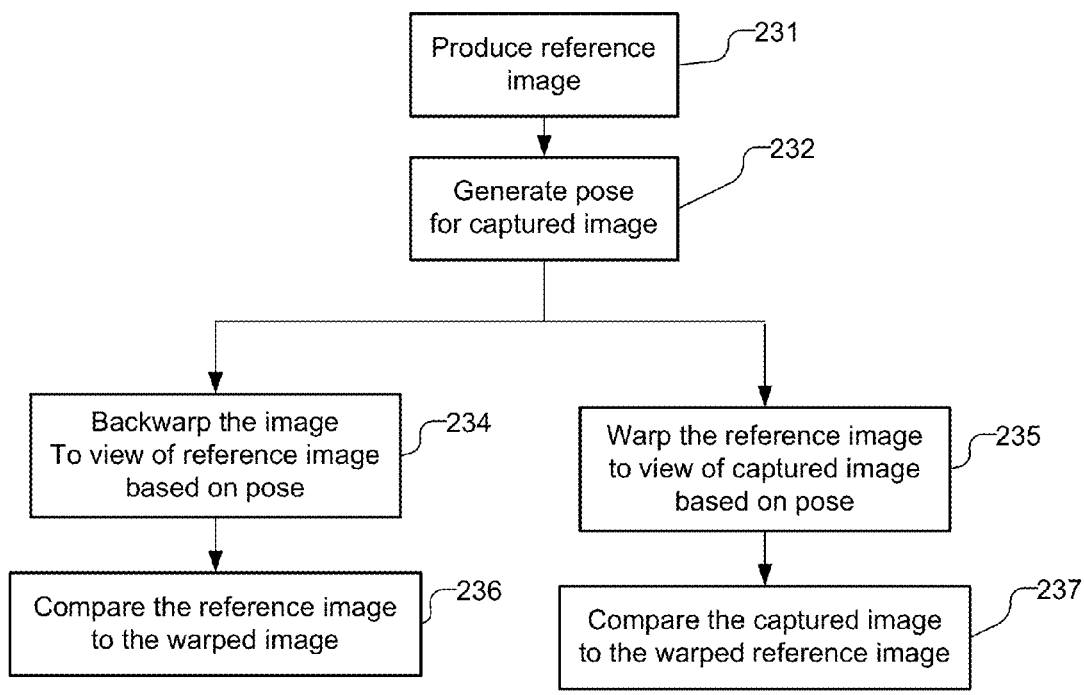
FIG. 4 is a flow chart illustrating different approaches to generating a mask.

FIG. 4, by way of example, illustrates different approaches to warping at least one of the captured image and the reference image to have the same view as the other (step 204 in FIG. 2) and the comparing the captured image and the reference image after warping (step 206 in FIG. 2). As illustrated, a reference image is produced (231), e.g., during an initialization process. The reference image may be produced during initialization by capturing an image of the target 106 without the presence of the foreground object 112. A pose is generated based on the captured image (232). The pose may be generated, for example, by computing a homography between the captured image and a reference image of the target, e.g., when the scene is planar. As is well known, a pose may be determined by extracting features from the captured image, e.g., using SIFT (Scale Invariant Feature Transforms), SURF (Speeded Up Robust Feature), etc., and comparing the extracted features in the captured image to similarly extracted features in the reference image and computing, e.g., the homography for mapping the extracted features from the captured image to the reference image.

Figures 5A, 5B, 5C:
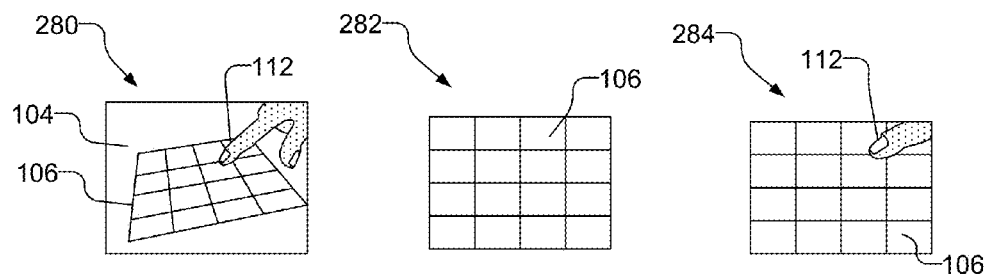
FIG. 5A illustrates a captured image that includes the target on the table and a foreground object.
FIG. 5B illustrates a reference image of the target from FIG. 5A.
FIG. 5C illustrates a warped image that includes the target and a portion of the foreground object.

In one embodiment, the captured image is warped based on the pose (234) to have the same view as the reference image, i.e., the captured image is backwarped. In this embodiment, a reference image may be produced (231) by warping an image captured during initialization based on a homography between that initial image, which includes the target but not the foreground object, and a known target image, i.e., a stored reference image for the target. Using an image captured during initialization as the reference image is advantageous so that the reference image has similar lighting conditions as subsequently captured images. By way of illustration, FIG. 5A shows a captured image 280 that includes the target 106 on the table 104, as well as the finger 112 of the user. FIG. 5B illustrates the reference image 282 of the target 106, which was previously produced during initialization, e.g., in step 231 of FIG. 4. As can be seen, the reference image 282 is an image of the target 106 in a frontal view. If desired, the reference image 282 may include additional space around the target 106, i.e., table 104. As can be seen in FIG. 5A, however, the captured image 280 is taken from a side view. Thus, the captured image 280 is backwarped so that the resulting warped image has the same view as the reference image, e.g., frontal view. Backwarping the captured image 280 may be performed, e.g., by determining the homography between the captured image 280 and the known target image and using the homography to warp the captured image 280. Thus, both the reference image 282 and the captured image 280 are from the same view. FIG. 5C, by way of example, illustrates a portion of the captured image 280 after warping as a warped image 284 that includes only the target 106 and the portion of the user's finger 112 that is above the target 106. If desired, the entire captured image 280 may be warped.

As discussed in FIG. 4, the reference image is then compared to the warped image to generate a mask (236). For example, pixels in the warped image may be compared to corresponding pixels in the reference image, or patches of pixels may be compared to corresponding patches of pixels in the reference image. A threshold is used with the results to generate the mask. The comparison may be performed by subtracting corresponding pixels or generating ratios of pixels. The pixel by pixel (or patch by patch) comparison of the warped image 284 and the reference image 282 may be performed, e.g., in the YUV domain. The intensity channel (Y) may be discarded and the chroma channels (U and V) may be compared individually. In one embodiment, the pixel by pixel (or patch by patch) comparison may be based on subtracting the reference image 282 from the warped image 284 as graphically illustrated in FIG. 6. If the difference between any pixel (or patch) in the warped image and the corresponding pixel (or patch) in the reference image, in either the U or V channel, is greater than a threshold, the pixel (or patch) in the warped image is determined to have a different color than the corresponding pixel (or patch) in the reference image and therefore the pixel (or patch) belongs to the foreground object, e.g., the user's finger 112. In another embodiment, rather than subtracting corresponding pixels, ratios are generated for corresponding pixels in the image and the reference image after warping and the resulting ratios for corresponding pixels are compared to a threshold to generate the mask, e.g., where the pixels are considered to be different colors if the ratio is outside a threshold centered on 1.

The threshold may be fixed or may be adapted for every image. Moreover, the threshold may be the same or vary for each pixel (or patch). In one implementation, the threshold may be generated, as a percentile of the pixel-wise difference between the two images, e.g., the threshold may be $90^{th}$ percentile of the difference values. In another implementation, the threshold may be determined by dividing the range of colors (in the chroma channels U and V) into N blocks such that each block visually appears to be the same color, and the threshold is the length of a single block. The value used for N may be based on the range of the U and V channels and may be determined empirically. For example, if U and V range from 0 to 1, dividing the range in 20 blocks produces a block length of 0.05, which is the threshold. In another implementation, the threshold may be based on collected statistics for the mean and variance of the colors each pixel over a few frames collected during initialization, where, e.g., mean±2.5*standard-deviation may be used as the threshold for a particular pixel.

Figure 6:
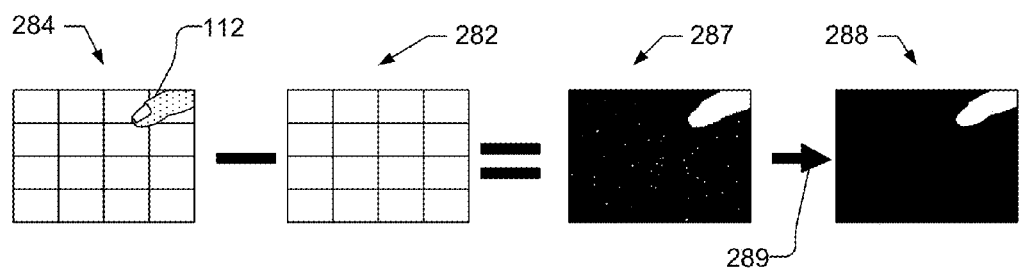
FIG. 6 graphically illustrates comparing the captured image to a reference image to generate a mask.

As illustrated in FIG. 6, comparison of the captured image and reference image may be used to produce a mask. For example, the difference between the reference image 282 and the warped image 284 is compared to a threshold resulting in a raw mask 287. As indicated by arrow 289 in FIG. 6, the raw mask 287 may be filtered, e.g., using Gaussian blur, or subjected to morphological operations, e.g., dilation or erosion, followed by a threshold to generate a mask 288 that is smooth. A filter may be used with a raw mask generated using ratios of corresponding pixels as opposed to subtracting corresponding pixels.

Alternatively, the comparison of the captured image and reference image may be used to identify the foreground object in the captured image without the intermediate steps of generating a mask and segmenting the foreground object from the captured image. For example, during the comparison of the warped image 284 and the reference image 282, any pixel that detected as being different, and thus in the foreground object, the pixel's intensities are copied to a corresponding location of a new image, which may be black initially. In this manner, the foreground pixels would be mapped to a foreground image 290 shown in FIG. 5D, without the use of a mask.

As illustrated in FIG. 4, instead of backwarping the captured image, the reference image may be warped to the same view as the captured image based on the pose (235). In this embodiment, the reference image is produced (231) as an initial image of the target without the foreground object. A homography between the reference image and the known target image and the pose from 232 are used to warp the reference image to the same view as the captured image. The captured image may be compared to the warped reference image (237) in a manner similar to that described above in reference to block 236.

If a mask is generated, as discussed in FIG. 3A, the mask may be used to segment the foreground object (224) from the captured image before detecting the pixels that belong to the point of interest on the foreground object. By way of example, where the captured image is backwarped to generate the mask, as described in blocks 234 and 236 in FIG. 4, the mask 288 (FIG. 6) may be applied to the warped image 284 (FIG. 5C) to remove the background, e.g., target 106, thereby leaving only the foreground object, i.e., finger 112, as illustrated by foreground image 290 in FIG. 5D. Similarly, if the reference image is warped to generate the mask, as described in blocks 235 and 237 in FIG. 4, the mask would be applied to the captured image to remove the background, e.g., target 106, thereby leaving only the foreground object, i.e., finger 112, in a foreground image. If a mask is not used, as discussed in FIG. 3B, the intensities of any pixel that differs in the comparison of the captured image and the reference image after warping may be mapped to a new image to produce the foreground image 290 in FIG. 5D.

Figures 5D, 5E, 5F:
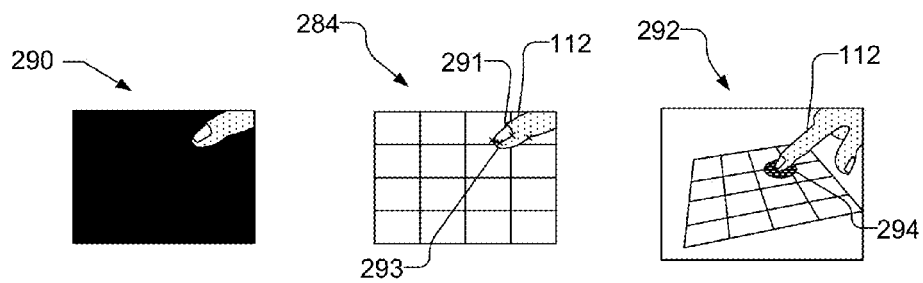
FIG. 5D illustrates the foreground object segmented with a mask.
FIG. 5E illustrates multiple points of interest detected on the foreground object in the warped image from FIG. 5C.
FIG. 5F illustrates the captured image with an augmentation rendered based on the detected foreground object.

The pixels that belong to the point of interest on the foreground object can then be detected. The pixels may be detected by extracting features using e.g., SIFT, SURF, or any other appropriate technique. The pixels may be detected, e.g., on the foreground image 290 shown in FIG. 5D, and mapped to the warped image 284 if the captured image is backwarped (234 in FIG. 4). FIG. 5E, by way of example, illustrates multiple pixels 291 detected on the finger 112 in the warped image 284, while the background, i.e., target 106, has no detected pixels. The pixels from the warped image 284 may be projected on the captured image based on the homography if desired. Alternatively, if the reference image is warped (235 in FIG. 4), the pixels may be detected on the resulting foreground image and mapped to the captured image, as the foreground image is not warped in this embodiment.

As discussed above, the pixels may be used to detect a point of interest on the foreground object in the image (step 208 in FIG. 2). The point of interest may be detected using the pixels and pre-determined geometric constraints, i.e., assuming the foreground object has specific configurations. Using a classifier, however, the point of interest may be detected using the pixels without pre-determined geometric constraints. Thus, the configuration of pixels 291 in FIG. 5E may be used by the classifier to detect a point of interest, e.g., the tip 293 of the foreground object 112. The point of interest from the warped image 284 may be projected on the captured image based on the homography. Alternatively, if the reference image is warped (235 in FIG. 4), the point of interest may be detected on the resulting foreground image and mapped to the captured image, as the foreground image is not warped in this embodiment.

Thus, the foreground object, and specifically, a point of interest on the foreground object, is detected in the captured image. The foreground object may be detected over the target 106, when the reference image 282 includes only the target 106, as illustrated in FIG. 5B. If the reference image 282 is extended to include additional space around the target 106, e.g., table 104, the foreground object may be detected over areas outside the target 106.

With the foreground object in the captured image detected, augmentations may be rendered with respect to the foreground object in the captured image. For example, augmentations may be rendered so that it appears the augmentation is under the foreground object, e.g., with the finger 112 partially occluding the disk 294 as illustrated in FIG. 5F.

With the foreground object 112 detected in the captured image, the foreground object may be tracked in subsequently captured images. The foreground object may be tracked in subsequently captured images, e.g., by repeating the process for each subsequently captured image, e.g., warping at least one of the subsequently captured image and the reference image of the scene, comparing the subsequently captured image to the reference image after warping to detect pixels that belong to the point of interest on the foreground object; and detecting the point of interest on the foreground object using the detected pixels in the subsequently captured image.

Alternatively, or additionally, the foreground object may be tracked in subsequently captured images, e.g., using a process such as optical flow to track the movement of the detected pixels in the point of interest, e.g., extracted features, in the subsequently captured images. The subsequently captured images may be displayed on the display 101 of the mobile device 100 while the augmentation is rendered on the display based on the tracked foreground object so that it appears that the user may interact with the augmentation. For example, as illustrated in FIG. 5F, in each captured image 280, the augmentation, e.g., disk 294, may be generated and displayed based on the position of the detected finger 112, as illustrated in image 292. Accordingly, the augmentations maybe rendered so that it appears that the tracked foreground object interacts with the augmentations in the display.

Figure 7:
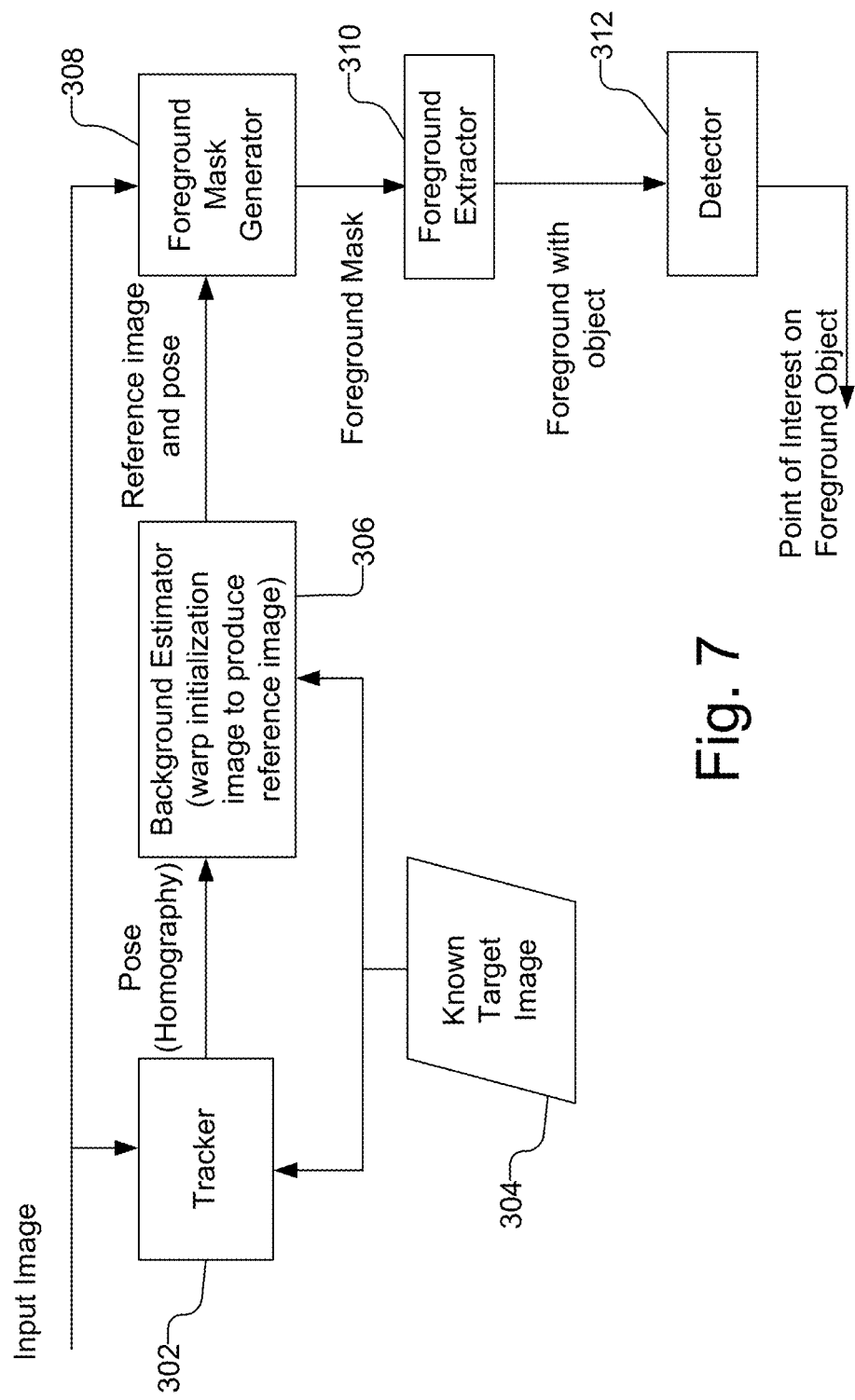
FIG. 7 illustrates a system diagram for detecting a foreground object in a captured image.

FIG. 7 illustrates a system diagram further detailing the detection of a foreground object, in which a mask of the foreground object is generated and used to segment the foreground object from the image. As can be seen, input images, i.e., initialization images and subsequently captured images, along with a known target image 304 are provided to a tracker 302. As discussed above, the tracker extracts features from the input image and the known target image 304, and generates the pose, i.e., homography between the input image and the reference image. The tracker may use a specific known target, a target acquired and learned in real-time, e.g., a rectangle, or may be based on SLAM or a sensor based tracker. As illustrated, background estimator 306 warps an image captured during initialization based on the known target image to form a reference image using the homography produced by the tracker 302. An input image, the reference image, and the current pose for the input image are provided to foreground mask generator 308. Foreground mask generator 308 warps the input image based on the pose so that the warped input image is from the same view as the reference image. The foreground mask generator 308 compares the difference between corresponding pixels in the warped input image and the reference image to a threshold to generate a foreground mask, which may be filtered, as discussed above. The resulting foreground mask may be provided to foreground extractor 310. The foreground extractor 310 uses the pixels from the foreground mask to extract the foreground from the input image to produce the segmented foreground object to the detector 312. The detector 312 detects pixels in the segmented foreground object, e.g., extracts features, and detects a point of interest on the foreground object based on the pixels. The detector 312 may include, e.g., a classifier, such as a Random Forest classifier, to detect the point of interest on the foreground object. The general operation of a classifier is well understood in the art. If desired, the foreground mask from the foreground mask generator 308 may be used by detector 312 directly to detect the foreground object, if the geometry of the object is known. For example, given the silhouette of a finger from the foreground mask, the detector 312 may determine the position of the finger, e.g., by using a classifier trained for this purpose.

It may be desirable to update the reference image if there is a scene change. For example, if a pencil is placed on the target 106 after the reference image has been initialized, the pencil will be detected as a foreground object. A scene change may be detected, e.g., by detecting consistent and stationary regions that appear in the foreground mask over a number of frames.

Additionally, variations in the appearance of the target in current illumination conditions can also be learned by back-warping the first few camera frames and generating statistics therefrom. This would also make the system less vulnerable to errors in pose returned by tracker 302 (FIG. 7). For example, a possible source of problems that may be encountered by the foreground mask generator 308 is a pose returned by the tracker 302 that is slightly off, e.g., a couple of pixels off, which would cause incorrect pixels to be compared in the warped current image and reference image. Another source of error is motion blur (or hand-jitter) that may cause pixels of the input image to be blurred with neighbors and, thus, the difference between the blurred pixels in the current image and the corresponding pixels in the reference image will be exaggerated. By using statistics, such as the mean and variance of each pixel's appearance (e.g., color) learned during initialization, as a threshold for generating the foreground mask, errors caused by motion blur and pose errors may be minimized.

Figure 8:
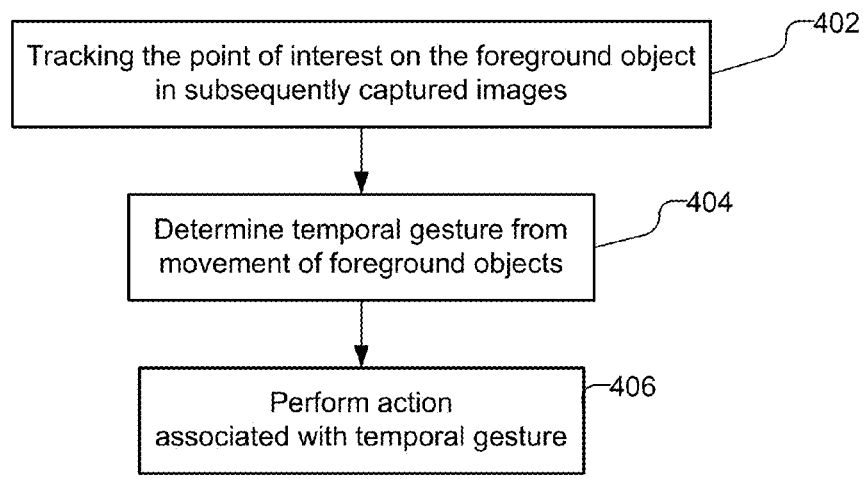
FIG. 8 is a flow chart illustrating tracking one or more foreground objects for gesture recognition.
Figure 9:
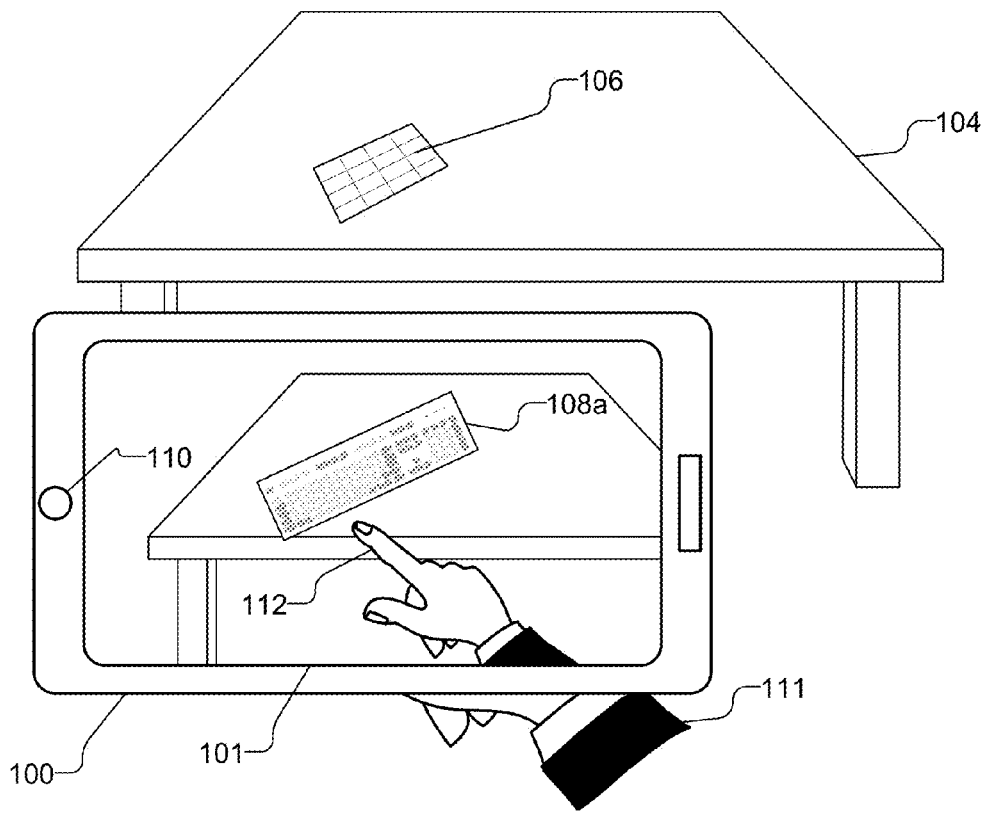
FIG. 9 is similar to FIG. 1 and illustrates the augmentation rendered in a space larger than the target.

Tracking the foreground object over multiple images may be used to discern a user's intended action, thus enabling the user to interact with the augmentation or perform other desired actions. For example, as illustrated in FIG. 8, the point of interest of the foreground object is tracked in subsequently captured images (402). If desired, one or more foreground objects, such as the user's finger tips, may be tracked in a series of images, e.g., a video stream. The movement of the tracked foreground object may be used to determine gestures (404), e.g., a temporal gesture that is produced by movement of the foreground object over a period of time. For example, a pattern of movement of the tracked foreground object may be compared to a database of gestures, which may be previously provided and/or learned and stored in the mobile device 100, to determine which gesture is being performed. Additionally, configurations of the foreground object(s) may be stored in a library of gestures, e.g., a pinch gesture, which can be compared to which the detected foreground object(s) may be compared to detect a gesture in a single-frame, i.e., non-temporal gesture. An action associated with the gesture may then be performed (406). The action may be related to interaction with the augmentation or may be related to control of the mobile device. For example, the determined gesture may be used to alter the display such as zooming in or out, dimming or brightening, etc. or to control an application, such as forwarding or rewind a song or video, etc. Thus, the detected point of interest on the foreground object may be used to in any desired application. Moreover, the augmentation may be an input device that may be manipulated by the user. FIG. 9, for example, is similar to FIG. 1, but illustrates the augmentation as a keyboard 108a, where the user's finger tips may be tracked in order to determine typing of the user. It should be noted that keyboard 108a is different than conventional virtual buttons, as the typing of the user is determined from the position, and if desired the motion, of the user's finger tips as opposed to being determined by the occlusion of specifically designed areas of a target as conventionally required by virtual buttons. Additionally, rather than a keyboard, the user interface may be other types of selection devices. In one embodiment, the augmentation rendered over the target 106 may be a display from the mobile device 100 projected onto the target 106. For example, a web browser window or other display interface may be warped and projected to appear over the target 106 in the display 101 while the user's finger or other object is tracked with respect to the rendered augmentation in order to interact with the displayed interface.

Figure 10:
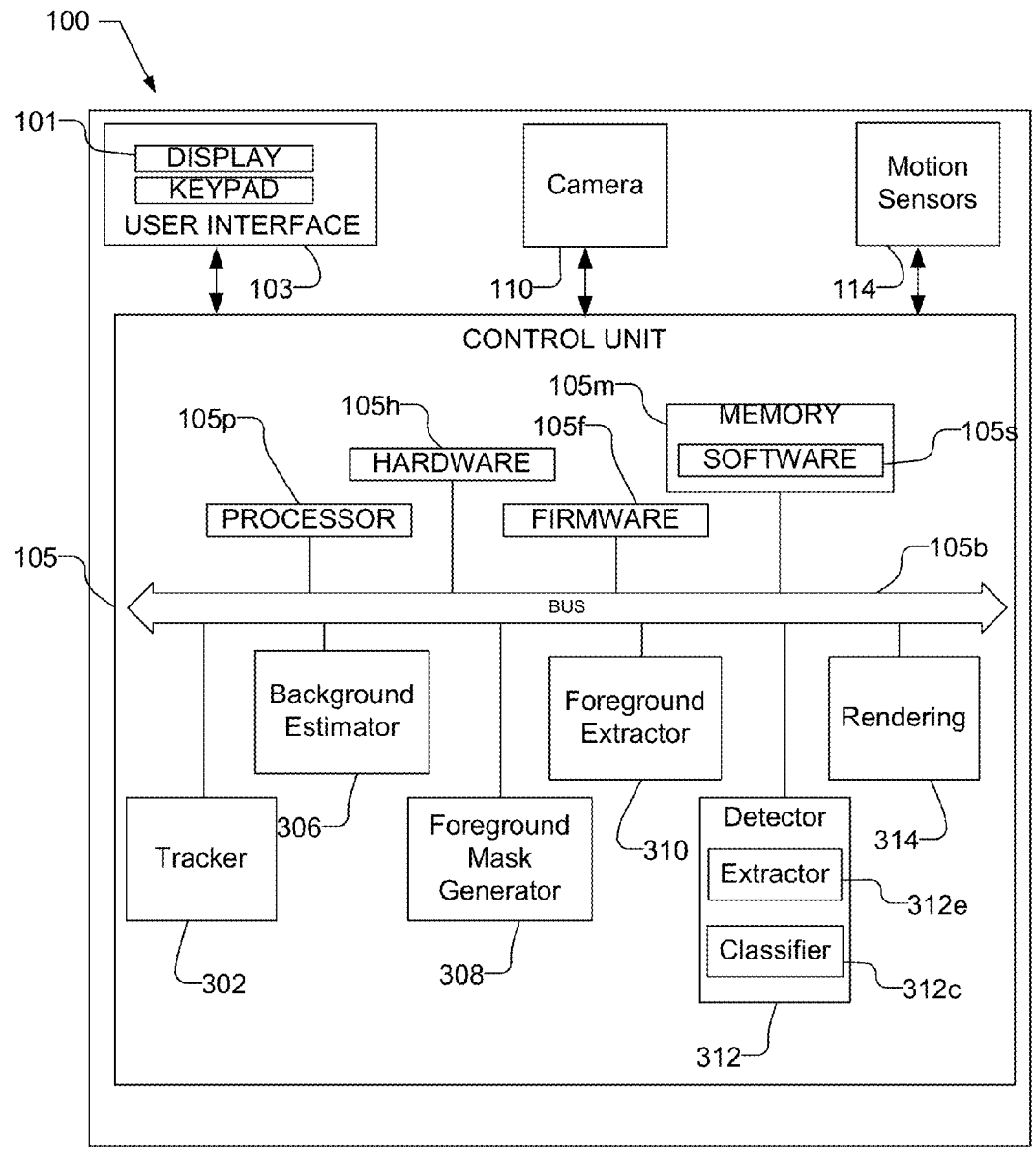
FIG. 10 is a block diagram of a mobile device capable of detecting and tracking a foreground object in an imaged scene.

FIG. 10 is a block diagram of a mobile device 100 capable of detecting a foreground object in an imaged scene. The mobile device 100 includes a camera 110 with which a scene is imaged. The mobile device 100 further includes a user interface 103 that includes e.g., the display 101, as well as a keypad or other input device through which the user can input information into the mobile device 100. The mobile device 100 may include additional elements, such as motion sensors 114, which may include, e.g., accelerometers, gyroscopes, magnetometers, etc., and may be used to assist in the pose determination of the mobile device 100, as is well known. Additional elements that are unrelated to the present disclosure, such as microphone and speaker in the user interface 103, wireless interfaces etc., may be included in the mobile device 100 as well.

The mobile device 100 also includes a control unit 105 that is connected to and communicates with the camera 110 and display 101, and other elements, such as motion sensors 114 if used. The control unit 105 accepts and processes data obtained from the camera 110 and causes the display 101 to display rendered augmentation as discussed herein. The control unit 105 may be provided by a bus 105b, processor 105p and associated memory 105m, hardware 105h, firmware 105f, and software 105s. The control unit 105 is further illustrated as including a tracker 302 that tracks the pose of the mobile device 100, or more specifically, the camera 110 with respect to the imaged scene, which may include a target 106. The control unit 105 may further include a background estimator 306 that may be used to generate a reference image, e.g., by warping an initial image without a foreground object into a reference image based on the pose generated by tracker 302. A foreground mask generator 308 in the control unit 105 compares the reference image to the current image to generate mask for the foreground object. A foreground extractor 310 may be used to segment the foreground object from the current image based on the mask, e.g., if geometry of the object is not already known. A detector 312 may include an extractor 312e for detecting pixels that belong to the point of interest on the foreground object, and a classifier 312c to detect the point of interest using the pixels, while the rendering module 314 is used to generate the augmentation that is shown in the display 101 over the captured image.

The various modules 302, 306, 308, 310, 312, and 314 are illustrated separately from processor 105p for clarity, but may be part of the processor 105p or implemented in the processor based on instructions in the software 105s which is run in the processor 105p. It will be understood as used herein that the processor 105p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105h, firmware 105f, software 105s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105m and executed by the processor 105p. Memory 105m may be implemented within or external to the processor 105p. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Thus, the mobile device 100 includes means for capturing an image of a scene with a foreground object that is not attached to the scene, the foreground object including a point of interest that is a distinct physical aspect, which may be, e.g., the camera 110. A means for warping at least one of the image and a reference image of the scene that does not include the foreground object so the image and the reference image have a same view may be, e.g., the tracker 302, background estimator 306, and foreground mask generator 308 or hardware 105h, firmware 105f, or processor 105p performing instructions received from software 105s. A means for comparing the image to the reference image after warping to detect pixels that belong to the point of interest on the foreground object may be, e.g., foreground mask generator 308, foreground extractor 310, and detector 312 and more specifically, an extractor 312e, or hardware 105h, firmware 105f, or processor 105p performing instructions received from software 105s. A means for detecting the point of interest on the foreground object using the detected pixels may be, e.g., the detector 312, and more specifically, a classifier, or hardware 105h, firmware 105f, or processor 105p performing instructions received from software 105s. A means for displaying the image on a display may be, e.g., the display 101. A means for rendering an augmentation on the display over the image based on the point of interest may be, e.g., the rendering module 314, or hardware 105h, firmware 105f, or processor 105p performing instructions received from software 105s.

A means for segmenting the foreground object from the image using a mask may be, e.g., foreground extractor 310, or hardware 105h, firmware 105f, or processor 105p performing instructions received from software 105s. A means for extracting the foreground object from the image may be, e.g., foreground extractor 310, or hardware 105h, firmware 105f, or processor 105p performing instructions received from software 105s. The means for warping at least one of the image and the reference image may include a means for generating a pose between the image and the reference image, which may be, e.g., the tracker 302 or hardware 105h, firmware 105f, or processor 105p performing instructions received from software 105s; and means for warping one of the image and the reference image based on the pose, which may be, e.g., the background estimator 306 or hardware 105*h*, firmware 105*f*, or processor 105*p* performing instructions received from software 105*s*. The mobile device 100 may include means for displaying subsequently captured images on a display, which may be, e.g., the display 101. Means for altering the augmentation based on the point of interest in the subsequently captured images may be, e.g., the rendering module 314 or hardware 105*h*, firmware 105*f*, or processor 105*p* performing instructions received from software 105*s*. The mobile device 100 may further include means for tracking the point of interest on the foreground object in subsequently captured images, which may be the tracker 302, background estimator 306, foreground mask generator 308, foreground extractor 310, and detector 312 or hardware 105*h*, firmware 105*f*, or processor 105*p* performing instructions received from software 105*s*. Means for detecting a temporal gesture based on movement of the of the point of interest on the foreground object may be, e.g., hardware 105*h*, firmware 105*f*, or hardware 105*h*, firmware 105*f*, or processor 105*p* performing instructions received from software 105*s*; and means for performing an action associated with the temporal gesture may be, e.g., hardware 105*h*, firmware 105*f*, or hardware 105*h*, firmware 105*f*, or processor 105*p* performing instructions received from software 105*s*.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing an image of a scene with a foreground object that is not attached to the scene, the foreground object including a point of interest that is a distinct physical aspect, wherein the foreground object is at least one of a finger of a user or a pointer and the point of interest is a tip of the at least one of the finger of the user or the pointer;
   warping at least one of the image and a reference image of the scene that does not include the foreground object so the image and the reference image have a same view;
   comparing the image to the reference image after warping to detect pixels that belong to the point of interest on the foreground object;
   detecting the point of interest on the foreground object using the detected pixels;
   displaying the image on a display; and
   rendering an augmentation on the display over the image based on the point of interest.

2. The method of claim 1, detecting the point of interest on the foreground object is performed without pre-determined geometric constraints on the foreground object.

3. The method of claim 1, wherein comparing the image to the reference image after warping to detect pixels that belong to the point of interest on the foreground object comprises:
   generating a mask for the foreground object;
   segmenting the foreground object from the image using the mask; and
   detecting the pixels using the foreground object segmented from the image.

4. The method of claim 1, wherein comparing the image to the reference image after warping to detect pixels that belong to the point of interest on the foreground object comprises:
   generating a foreground object image using pixels in the image that are different than corresponding pixels in the reference image; and
   detecting the pixels that belong to the point of interest on the foreground object in the foreground object image.

5. The method of claim 1, wherein comparing the image and the reference image after warping comprises:
   subtracting pixels in the image from corresponding pixels in the reference image to generate a difference for each pixel after warping; and
   comparing the difference for each pixel to a threshold.

6. The method of claim 1, wherein comparing the image and the reference image after warping comprises:
   generating ratios for corresponding pixels in the image and the reference image after warping; and
   comparing the ratios for corresponding pixels to a threshold.

7. The method of claim 1, wherein warping at least one of the image and the reference image comprises:
   generating a pose between the image and the reference image; and
   warping one of the image and the reference image based on the pose.

8. The method of claim 1, further comprising:
   displaying subsequently captured images on the display; and
   altering the augmentation based on the point of interest in the subsequently captured images.

9. The method of claim 1, wherein rendering the augmentation on the display comprises rendering the augmentation to appear as if the augmentation is underneath the foreground object displayed on the display.

10. The method of claim 1, wherein the scene includes multiple foreground objects with points of interest, the method further comprising: detecting pixels that belong to the points of interest on the multiple foreground objects by comparing the image to the reference image after warping; and detecting the points of interest on the multiple foreground objects using the detected pixels.

11. The method of claim 1, further comprising:
   tracking the point of interest on the foreground object in subsequently captured images;
   detecting a temporal gesture based on movement of the point of interest on the foreground object; and
   performing an action associated with the temporal gesture.

12. The method of claim 1, further comprising:
   comparing a configuration of the point of interest on the foreground object to a library of gesture configurations;
   identifying a gesture from the configuration of the point of interest on the foreground object; and
   performing an action associated with the gesture.

13. The method of claim 1, wherein the image is captured using a camera with no depth information.

14. The method of claim 1, further comprising tracking the foreground object in subsequently captured images comprises:
   for each subsequently captured image, warping at least one of the subsequently captured image and the reference image of the scene;
   comparing the subsequently captured image to the reference image after warping to detect pixels that belong to the point of interest on the foreground object; and
   detecting the point of interest on the foreground object using the detected pixels in the subsequently captured image.

15. The method of claim 1, further comprising tracking the foreground object in subsequently captured images using optical flow with the pixels that belong to the point of interest.

16. An apparatus comprising:
a camera;
a display; and
a processor coupled to the display and coupled to the camera to receive an image of a scene with a foreground object that is not attached to the scene, the foreground object including a point of interest that is a distinct physical aspect, wherein the foreground object is at least one of a finger of a user or a pointer and the point of interest is a tip of the at least one of the finger of the user or the pointer, the processor configured to warp at least one of the image and a reference image of the scene that does not include the foreground object so the image and the reference image have a same view, compare the image to the reference image after warping to detect pixels that belong to the point of interest on the foreground object, detect the point of interest on the foreground object using the detected pixels, display the image on the display, and render an augmentation on the display over the image based on the point of interest.

17. The apparatus of claim 16, wherein the processor is configured to detect the point of interest on the foreground object without pre-determined geometric constraints on the foreground object.

18. The apparatus of claim 16, wherein the processor is configured to compare the reference image after warping to detect pixels that belong to the point of interest on the foreground object by being configured to:
generate a mask for the foreground object;
segment the foreground object from the image using the mask; and
detect the pixels using the foreground object segmented from the image.

19. The apparatus of claim 16, wherein the processor is configured to compare the reference image after warping to detect pixels that belong to the point of interest on the foreground object by being configured to:
generate a foreground object image using pixels in the image that are different than corresponding pixels in the reference image; and
detect the pixels that belong to the point of interest on the foreground object in the foreground object image.

20. The apparatus of claim 16, wherein the processor is configured to compare the image and the reference image after warping by being configured to subtract pixels in the image from corresponding pixels in the reference image to generate a difference for each pixel after warping; and compare the difference for each pixel to a threshold.

21. The apparatus of claim 16, wherein the processor is configured to compare the image and the reference image after warping by being configured to generate ratios for corresponding pixels in the image and the reference image after warping, and compare the ratios for corresponding pixels to a threshold.

22. The apparatus of claim 16, wherein the processor is configured to warp the at least one of the image and the reference image by being configured to generate a pose between the image and the reference image, and warp one of the image and the reference image based on the pose.

23. The apparatus of claim 16, wherein the processor is further configured to cause subsequently captured images to be displayed on the display, and alter the augmentation based on the point of interest in the subsequently captured images.

24. The apparatus of claim 16, wherein the processor is configured to render the augmentation on the display by being configured to render the augmentation to appear as if the augmentation is underneath the foreground object displayed on the display.

25. The apparatus of claim 16, wherein the scene includes multiple foreground objects with points of interest, wherein the processor is further configured to:
detect pixels that belong to the points of interest on the multiple foreground objects by comparing the image to the reference image after warping; and
detect the points of interest on the multiple foreground objects using the detected pixels.

26. The apparatus of claim 16, wherein the processor is further configured to:
track the point of interest on the foreground object in subsequently captured images;
detect a temporal gesture based on movement of the point of interest on the foreground object; and
perform an action associated with the temporal gesture.

27. The apparatus of claim 16, wherein the processor is further configured to:
compare a configuration of the point of interest on the foreground object to a library of gesture configurations;
identify a gesture from the configuration of the point of interest on the foreground object; and
perform an action associated with the gesture.

28. The apparatus of claim 16, wherein the camera provides no depth information.

29. The apparatus of claim 16, wherein the processor is configured to track the foreground object in subsequently captured images by being configured to:
for each subsequently captured image, warp at least one of the subsequently captured image and the reference image of the scene;
compare the subsequently captured image to the reference image after warping to detect pixels that belong to the point of interest on the foreground object; and
detect the point of interest on the foreground object using the detected pixels in the subsequently captured image.

30. The apparatus of claim 16, wherein the processor is configured to track the foreground object in subsequently captured images by being configured use optical flow with the pixels that belong to the point of interest.

31. An apparatus comprising:
means for capturing an image of a scene with a foreground object that is not attached to the scene, the foreground object including a point of interest that is a distinct physical aspect, wherein the foreground object is at least one of a finger of a user or a pointer and the point of interest is a tip of the at least one of the finger of the user or the pointer;
means for warping at least one of the image and a reference image of the scene that does not include the foreground object so the image and the reference image have a same view;
means for comparing the image to the reference image after warping to detect pixels that belong to the point of interest on the foreground object;
means for detecting the point of interest on the foreground object using the detected pixels;
means for displaying the image on a display; and
means for rendering an augmentation on the display over the image based on the point of interest.

32. The apparatus of claim 31, wherein comparing the image to the reference image after warping to detect pixels that belong to the point of interest on the foreground object generates a mask for the foreground object, the apparatus further comprising a means for segmenting the foreground object from the image using the mask.

33. The apparatus of claim 31, the apparatus further comprising a means for extracting the foreground object from the image.

34. The apparatus of claim 31, wherein the means for warping at least one of the image and the reference image comprises:
  means for generating a pose between the image and the reference image; and
  means for warping one of the image and the reference image based on the pose.

35. The apparatus of claim 31, wherein the means for comparing the image and the reference image after warping subtracts pixels in the image from corresponding pixels in the reference image to generate a difference for each pixel after warping; and compares the difference for each pixel to a threshold.

36. The apparatus of claim 31, wherein the comparing the image and the reference image after warping generates ratios for corresponding pixels in the image and the reference image after warping; and compares the ratios for corresponding pixels to a threshold.

37. The apparatus of claim 31, further comprising:
  means for displaying subsequently captured images on the display; and
  means for altering the augmentation based on the point of interest in the subsequently captured images.

38. The apparatus of claim 31, further comprising:
  means for tracking the point of interest on the foreground object in subsequently captured images;
  means for detecting a temporal gesture based on movement of the point of interest on the foreground object; and
  means for performing an action associated with the temporal gesture.

39. A non-transitory storage medium including program code stored thereon, comprising:
  program code to receive an image of a scene with a foreground object that is not attached to the scene, the foreground object including a point of interest that is a distinct physical aspect, wherein the foreground object is at least one of a finger of a user or a pointer and the point of interest is a tip of the at least one of the finger of the user or the pointer;
  program code to warp at least one of the image and a reference image of the scene that does not include the foreground object so the image and the reference image have a same view;
  program code to compare the image to the reference image after warping to detect pixels that belong to the point of interest on the foreground object;
  program code to detect the point of interest on the foreground object using the detected pixels;
  program code to display the image on a display; and program code to render an augmentation on the display over the image based on the point of interest.

40. The non-transitory storage medium of claim 39, further comprising program code to extract the foreground object from the image.

41. The non-transitory medium of claim 39, wherein the program code to warp at least one of the image and the reference image comprises:
  program code to generate a pose between the image and the reference image; and
  program code to warp one of the image and the reference image based on the pose.

42. The non-transitory medium of claim 39, wherein the program code to compare the image and the reference image after warping comprises:
  program code to subtract pixels in the image from corresponding pixels in the reference image to generate a difference for each pixel after warping; and
  program code to compare the difference for each pixel to a threshold.

43. The non-transitory medium of claim 39, wherein the program code to comparing the image and the reference image after warping comprises:
  program code to generate ratios for corresponding pixels in the image and the reference image after warping; and
  program code to compare the ratios for corresponding pixels to a threshold.

44. The non-transitory medium of claim 39, further comprising:
  program code to display subsequently captured images; and
  program code to alter the augmentation based on the point of interest in the subsequently captured images.

45. The non-transitory medium of claim 39, further comprising:
  program code to track the point of interest on the foreground object in subsequently captured images;
  program code to detect a temporal gesture based on movement of the point of interest on the foreground object; and
  program code to perform an action associated with the temporal gesture.

* * * * *

UNITED STATES PATENT AND TRADEMARK OFFICE
CERTIFICATE OF CORRECTION

PATENT NO.       : 9,076,257 B2                         Page 1 of 1
APPLICATION NO.  : 13/733740
DATED            : July 7, 2015
INVENTOR(S)      : Piyush Sharma et al.

It is certified that error appears in the above-identified patent and that said Letters Patent is hereby corrected as shown below:

In The Claims

In column 18, line 12, in claim 41, after "non-transitory" insert -- storage --.

In column 18, line 19, in claim 42, after "non-transitory" insert -- storage --.

In column 18, line 27, in claim 43, after "non-transitory" insert -- storage --.

In column 18, line 34, in claim 44, after "non-transitory" insert -- storage --.

In column 18, line 40, in claim 45, after "non-transitory" insert -- storage --.

Signed and Sealed this
Twenty-fourth Day of November, 2015

Michelle K. Lee
*Director of the United States Patent and Trademark Office*